(12) United States Patent
     Chartrand (10) Patent No.: US 10,393,323 B1
(45) Date of Patent: Aug. 27, 2019

(54) LED LIGHT TUBE ADAPTER KIT FOR TROFFERS

(71) Applicant: Jean-Claude Chartrand, London (CA)

(72) Inventor: Jean-Claude Chartrand, London (CA)

( * ) Notice: Subject to any disclaimer, the term of this patent is extended or adjusted under 35 U.S.C. 154(b) by 249 days.

(21) Appl. No.: 15/422,051

(22) Filed: Feb. 1, 2017

Related U.S. Application Data (60) Provisional application No. 62/289,374, filed on Feb. 1, 2016.

(51) Int. Cl.
| | |
|---|---|
| *F21S 8/02* | (2006.01) |
| *F21K 9/278* | (2016.01) |
| *F21V 23/06* | (2006.01) |
| *F21V 17/16* | (2006.01) |
| *F21V 3/02* | (2006.01) |
| *F21V 23/00* | (2015.01) |
| *F21K 9/275* | (2016.01) |
| *F21V 15/01* | (2006.01) |

(52) U.S. Cl.
CPC .............. *F21K 9/278* (2016.08); *F21K 9/275* (2016.08); *F21S 8/026* (2013.01); *F21V 3/02* (2013.01); *F21V 15/01* (2013.01); *F21V 17/16* (2013.01); *F21V 23/001* (2013.01); *F21V 23/06* (2013.01)

(58) Field of Classification Search
None
See application file for complete search history.

(56) References Cited

U.S. PATENT DOCUMENTS

| | | | |
|---|---|---|---|
| 6,739,734 B1 | 5/2004 | Hulgan | |
| 8,956,013 B1 * | 2/2015 | Shew | F21S 9/022 |
| | | | 362/249.02 |
| 9,517,280 B2 * | 12/2016 | Lynn | A61L 2/10 |
| 2007/0228999 A1 | 10/2007 | Kit | |
| 2010/0148673 A1 | 6/2010 | Stewart et al. | |
| 2011/0084608 A1 | 4/2011 | Lin et al. | |
| 2011/0121756 A1 | 5/2011 | Thomas et al. | |
| 2012/0113628 A1 | 5/2012 | Burrow et al. | |
| 2012/0161666 A1 | 6/2012 | Anthony et al. | |
| 2013/0155670 A1 | 6/2013 | Handsaker | |
| 2014/0168961 A1 * | 6/2014 | Dubord | F21V 21/14 |
| | | | 362/225 |

* cited by examiner

*Primary Examiner* — Tho D Ta
(74) *Attorney, Agent, or Firm* — Cramer Patent & Design, PLLC; Aaron R. Cramer (57) ABSTRACT

A light tube adapter kit for converting fluorescent troffers to use LED light tubes is provided. The adapter kit includes a light tube having electrical connector prongs at a connector end, a troffer fixture, a non-powered adjustment mechanically connected to the troffer fixture, a powered adjustment strip disposed across and connected to the troffer fixture, a retention clip that mechanically attaches a first end of the light tube to the non-powered adjustment clip, and a tombstone fixture that is electrically connected to the powered adjustment strip. The tombstone fixture mechanically retains a powered end of the light tube and transfers electrical power from the powered adjustment strip to the connector prongs.

17 Claims, 8 Drawing Sheets

LED LIGHT TUBE ADAPTER KIT FOR TROFFERS

RELATED APPLICATIONS

The present invention is a continuation-in-part of, was first described in and claims the benefit of U.S. Provisional Application No. 62/289,374 filed Feb. 1, 2016, the entire disclosures of which are incorporated herein by reference.

FIELD OF THE INVENTION

The present invention relates generally to converting florescent tube troffers to use LED (light-emitting diode) light sources.

BACKGROUND OF THE INVENTION

Concerns over the limited supply of fossil fuels have generated a great deal of research and engineering work in the area of alternative fuel and energy sources. Additionally, air pollution produced by the combustion of fossil fuels is another area of great environmental concern. The concerns related to fossil fuels impact on many things that we do, from driving automobiles to recycling consumer products.

One (1) area that has received particular attention is that of reducing energy consumption used by illumination sources. Fluorescent lamp fixtures often take the form of troffers. Such fluorescent lamp fixtures have been the mainstay of lighting in offices, stores, schools, and similar locations for many years. A troffer is typically a rectangular light fixture that fits into a dropped ceiling grid. Troffers are usually recessed above the ceiling grid but can also be implemented as surface mount boxes. While troffers were originally designed for use with standard fluorescent lamps their widespread acceptance, modular benefits, low cost and ease of installing and maintaining have led them to be used with integral LED sources. While fluorescent lamp troffers are a major improvement over incandescent lamps they cannot compete with high efficiency LED lighting.

While LED lighting is highly energy efficient the cost of replacing existing light fixtures with LED light fixtures has been so high that many users simply put up with the inefficiencies of fluorescent lamps. Recently some manufacturers and suppliers have responded with LED retrofit kits. While such retrofit kits can be beneficial they are typically difficult and time consuming to install and usually do not afford the user with the ability to increase or decrease the number of light tubes to compensate for the increased efficiency of LED lamps.

Accordingly, there exists a need for a device by which fluorescent lamps in existing troffers can be easily upgraded to LED-style lighting troffers at low cost.

SUMMARY OF THE INVENTION

Concerns over the limited supply of fossil fuels have generated a great deal of research and engineering work in the area of alternative fuel and energy sources. Additionally, air pollution produced by the combustion of fossil fuels is another area of great environmental concern. The concerns related to fossil fuels impact on many things that we do, from driving automobiles to recycling consumer products.

One (1) area that has received particular attention is that of reducing energy consumption used by illumination sources. Fluorescent lamp fixtures often take the form of troffers. Such fluorescent lamp fixtures have been the mainstay of lighting in offices, stores, schools, and similar locations for many years. A troffer is typically a rectangular light fixture that fits into a dropped ceiling grid. Troffers are usually recessed above the ceiling grid but can also be implemented as surface mount boxes. While troffers were originally designed for use with standard fluorescent lamps their widespread acceptance, modular benefits, low cost and ease of installing and maintaining have led them to be used with integral LED sources. While fluorescent lamp troffers are a major improvement over incandescent lamps they cannot compete with high efficiency LED (light-emitting diode) lighting.

While LED lighting is highly energy efficient the cost of replacing existing light fixtures with LED light fixtures has been so high that many users simply put up with the inefficiencies of fluorescent lamps. Recently some manufacturers and suppliers have responded with LED retrofit kits. While such retrofit kits can be beneficial they are typically difficult and time consuming to install and usually do not afford the user with the ability to increase or decrease the number of light tubes to compensate for the increased efficiency of LED lamps.

Accordingly, there exists a need for a device by which fluorescent lamps in existing troffers can be easily upgraded to LED-style lighting troffers at low cost.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3b is a bottom view of the tombstone fixture 45 shown in FIGS. 2 and 3a;

FIG. 3c is a sectional view of the tombstone fixture 45 taken along line I-I of FIG. 3a;

DESCRIPTIVE KEY

10 LED light tube adapter kit
15 existing fluorescent troffer fixture
20 LED light tube
25 "U"-shaped retention clip
30 non-powered adjustment clip
35 first travel path "$t_1$"
40 powered end
45 tombstone fixture
50 powered adjustment strip
55 electrical plug connector 60 incoming power conductor
65 fixture drop wire
70 electrical connector
75 second travel path "$t_2$"
80 fastener
85 base structure
90 front housing
95 rear housing
100 rotatable retention element
105 retention clip
110 upper entry slot
115 movable slot
120 third travel path "$t_3$"
125 first contact spring
126 second contact spring
130 first conductive contact
135 reinforcing grid
140 second conductive contact
145 interior conductor
150 lower power rail
155 upper protective cover
160 lower retention channel
165 outer snap clip area
170 inner snap clip area
175 power channel
180 first power conductor
185 second power conductor
190 cap area
195 outer cap clip
200 inner cap clip
205 conductive prong

DETAILED DESCRIPTION OF THE PREFERRED EMBODIMENT

The preferred embodiment of the present invention is depicted in FIGS. 1 through 6. However, the invention is not limited to the specifically described embodiment. A person skilled in the art will appreciate that many other embodiments of the invention are possible without deviating from the basic concept of the invention. Any such work around will also fall under the scope of this invention.

In the figures like numbers refer to like elements throughout. Additionally, the terms "a" and "an" as used herein do not denote a limitation of quantity, but rather denote the presence of at least one (1) of the referenced items.

Figure 1:
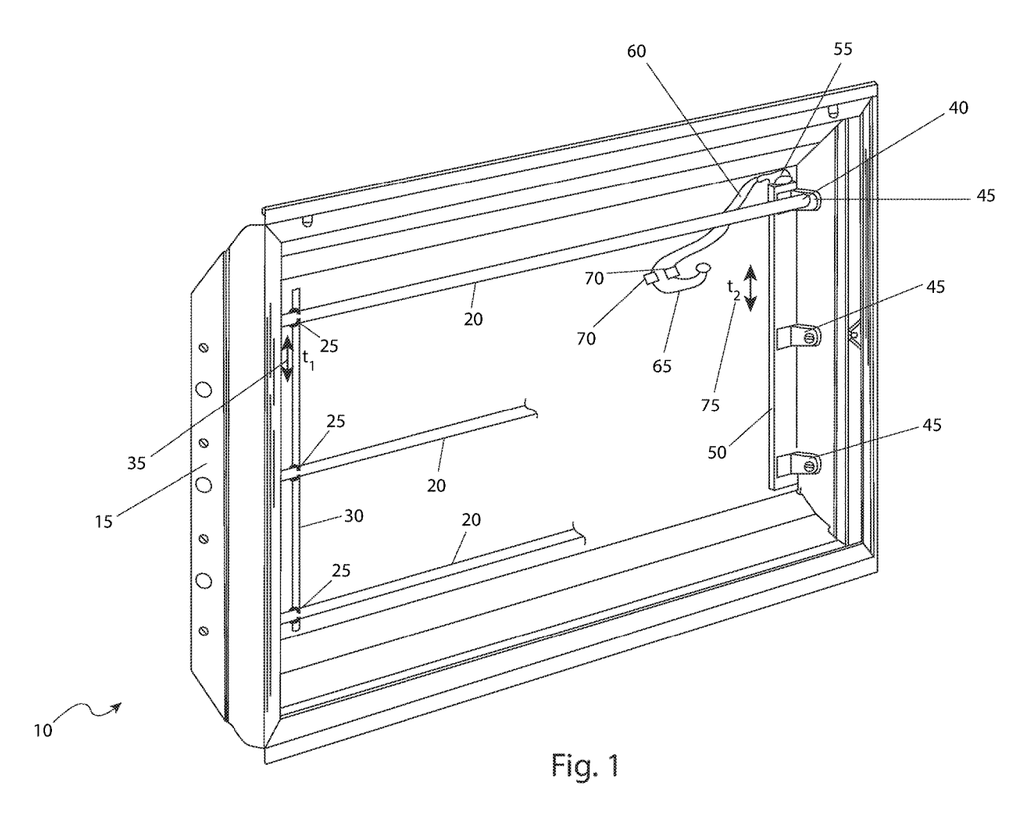
FIG. 1 is an isometric view of an LED light tube adapter kit for fluorescent lamp troffer fixtures 10 which is in accord with a preferred embodiment of the present invention and which is installed in an existing fluorescent troffer fixture 15.

Refer now to FIG. 1 for an isometric view of a LED light tube adapter kit for a fluorescent troffer fixture 10 installed in an existing fluorescent troffer fixture 15 in accord with a preferred embodiment of the present invention. The illustrated fluorescent troffer fixture 15 is a conventional troffer style fluorescent ceiling such as those that would be recessed within an architectural drop ceiling. The illustrated fluorescent troffer fixture 15 is depicted as a "2×4" troffer fixture. However other types of troffer fixtures such as "2×2" fixtures with straight or "U"-shaped fluorescent tubes, "1×4" troffer fixtures, or troffer fixtures with the dimension of six inches by forty-eight inches (6×48 in.) as used in emergency stair cases in high rise buildings could also be utilized.

The LED light tube adapter kit for a fluorescent troffer fixture 10 is shown using three LED light tubes 20. In practice, the number of LED light tubes 20 can vary from one (1) up to six (6) or more. One (1) end of each LED light tube 20 is held in place by a "U"-shaped retention clip 25 which is in mechanical contact with the end of an associated LED light tube 20 and with a non-powered adjustment clip 30. The non-powered adjustment clip 30 is beneficially disposed across the troffer and in parallel to a wall of the troffer. The non-powered adjustment clip 30 mechanically supports the ends of the LED light tubes 20. Each retention clip 25 can move on the non-powered adjustment clip 30 along a first travel path "$t_1$" 35. Such movement enables controlling the spacing of the LED light tubes 20. Additional retention clip 25 can be added to the non-powered adjustment clip 30 as required to match the number of LED light tubes 20.

The end of the LED light tubes 20 opposite the non-powered adjustment clip 30 is referred to herein as the powered end 40. The powered ends 40 are held in place by a tombstone fixture 45, so-called because of its overall appearance. Further information on the mechanical and electrical structures of the tombstone fixture 45 is provided below. The quantity of tombstone fixture 45 per adapter kit 10 will match the quantity of LED light tubes 20 to be installed.

The LED light tubes 20 have internal drivers that are capable of operating at the supplied voltage and which are in mechanical and electrical contact with the tombstone fixtures 45. The tombstone fixtures 45 are in turn in mechanical and electrical contact with a powered adjustment strip 50. Further information on the mechanical and electrical structure of the powered adjustment strip 50 is provided below. The powered adjustment strip 50 is operatively connected to the electrical line power, typically one hundred twenty volt (120-VAC), two hundred eight volt (208-VAC), two hundred seventy-seven volt (277-VAC), three hundred forty-seven volt (347-VAC), or the like via an electrical plug connector 55. The electrical plug connector 55 provides an appropriate line voltage to the internal conductors of the powered adjustment strip 50 from incoming power conductors 60. In turn, the incoming power conductors 60 receive their line voltage from fixture drop wires 65 that are part of the premises wiring system.

The incoming power conductors 60 and fixture drop wires 65 are held in mechanical and electrical contact with one another via an electrical connector 70 such as a wire nut or a power supply terminal block as manufactured by the WAGO Corporation, such as but not limited to WAGO Luminaire Disconnect no. 873-902. Other terminals such as the WAGO Luminaire Disconnect no. 873-903 (three-pole) may utilize alternate conductors to selectively energize different LED light tubes 20 to provide different levels of illumination as controlled by occupancy sensors, multiple light switches, or the like. That will allow for reduced energy usage and associated cost savings. Alternatively, a terminal connector such as but not limited to WAGO no. 224-101, with two (2) connectors on each wire with jumper wire in between could be used to connect alternate control devices such as remote control switches, remote control relays, or other future technologies related to Internet control, wireless control, or the like.

Each of the tombstone fixture 45 moves on the powered adjustment strip 50 along a second travel path "$t_2$" 75. Such movement allows for adjusting the spacing of the LED light tubes 20 being installed. Once properly position the tombstone fixture 45 are mechanically secured to and in electrical contact with the powered adjustment strip 50 and with additional components as described below. The powered adjustment strip 50 is secured to the existing fluorescent troffer fixture 15 by fasteners such as "no. 8" self-tapping screws, such as those from the Robertson Company or the like.

Figure 2:
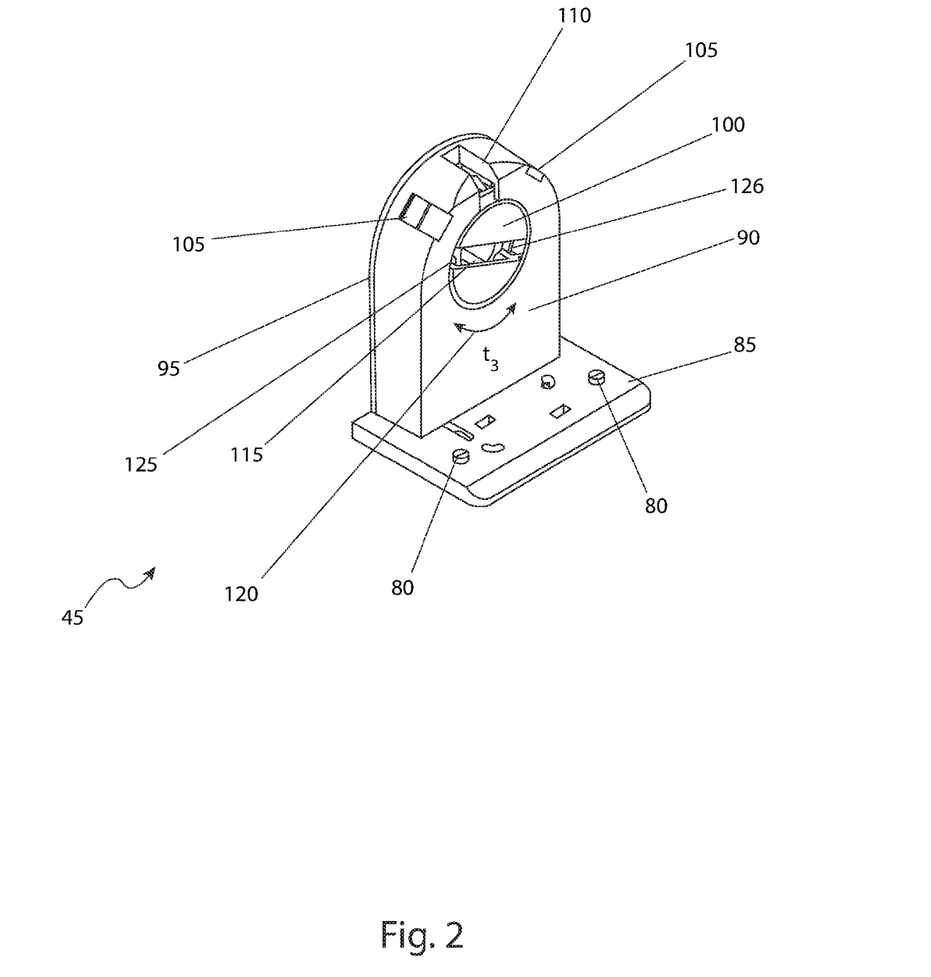
FIG. 2 is an isometric view of a tombstone fixture 45 that is part of the adapter kit 10 shown in FIG. 1.

Refer now to FIG. 2 for an isometric view of the tombstone fixtures 45. Each tombstone fixture 45 has a base structure 85 to which fasteners 80 connect to the powered adjustment strip 50 (see FIG. 1). The tombstone fixture 45 also includes a front housing 90, a rear housing 95, and a rotatable retention element 100, all of which are envisioned to be manufactured of a non-conductive plastic. The rotatable retention element 100 is held captive inside the front housing 90. The front housing 90 and the rear housing 95 are fastened together by a series of retention clips 105, of which only two (2) are shown due to illustrative limitations. An upper entry slot 110 allows for entry of the conductive prongs of the LED light tubes 20 (see FIG. 1) which align with a movable slot 115 of the rotatable retention element 100. Once the connective prongs are fully inserted the LED light tubes 20 can be rotated along with the rotatable retention element 100 in compliance with a third travel path "$t_3$" 120. Once rotated approximately ninety degrees (90°) the conductive prongs of the LED light tubes 20 (see FIG. 1) engage a first contact spring 125 and a second contract spring 126 that are inside the front housing 90. Further clarification of the first contact spring 125 and second contact spring 126 is provided below.

Figure 3A:
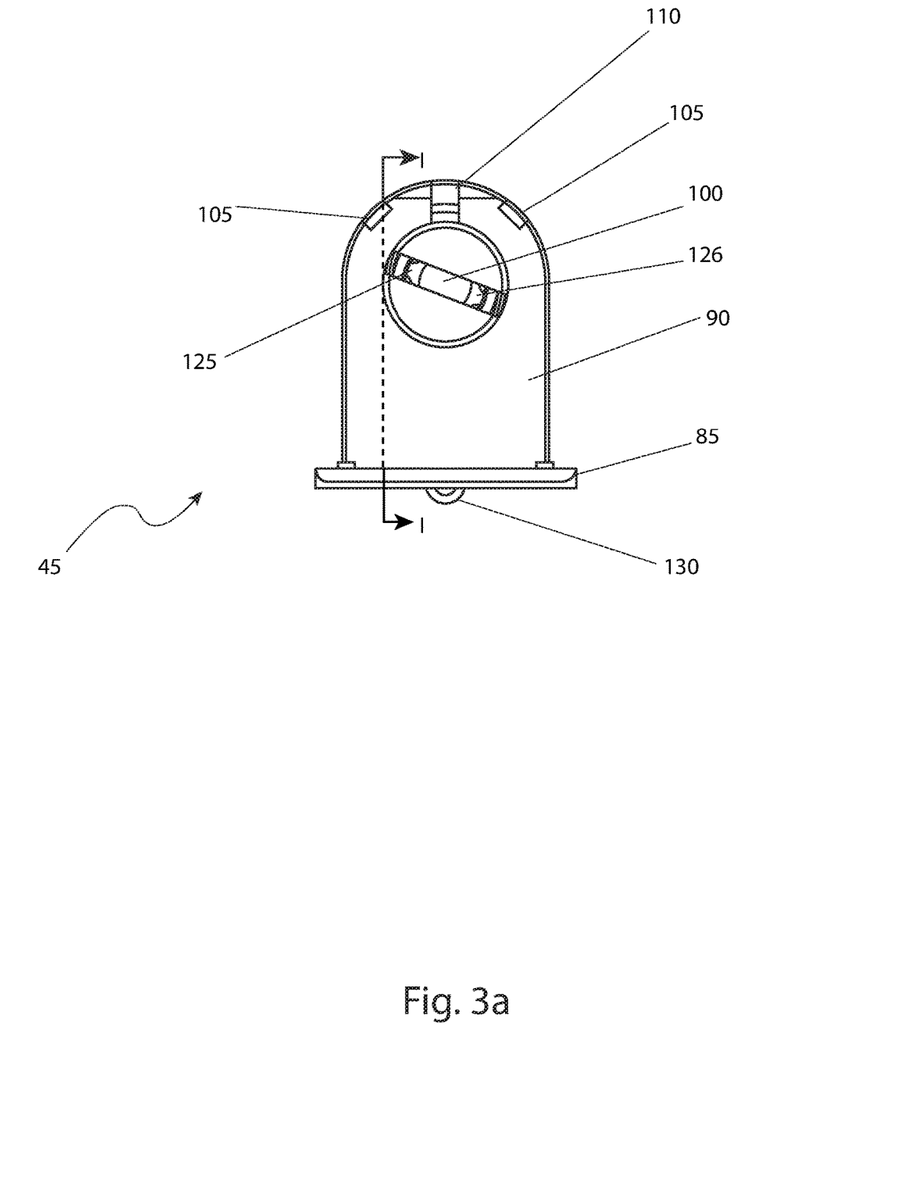
FIG. 3a is a front view of the tombstone fixture 45 shown in FIG. 2.

Refer now to FIG. 3a for a front view of the tombstone fixture 45. This view shows further detail and clarifies the positioning of the base structure 85, the front housing 90, the rotatable retention element 100, the retention clips 105, the upper entry slot 110, the first contact spring 125 and the second contact spring 126. Also visible is a first conductive contact 130 which is electrical contact with the first contact spring 125. The tombstone fixtures 45 are similar to "non-shunted" tombstone fixtures typically used with conventional fluorescent tubes.

Figure 3B:
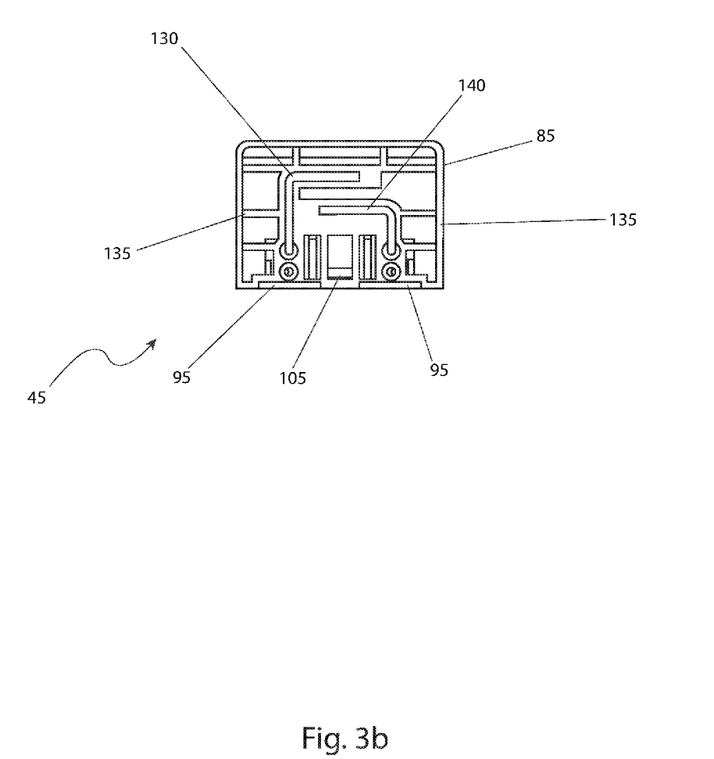

Refer next to FIG. 3b for a bottom view of the tombstone fixture 45. This view shows the base structure 85 as having a reinforcing grid 135 for structural integrity. Additional retention clips 105 are shown for helping retain the rear housing 95. A second conductive contact 140 is shown near the first conductive contact 130. Both the first conductive contact 130 and the second conductive contact 140 are electrically isolated by the reinforcing grid. However, the first conductive contact 130 and the second conductive contact 140 are in respective electrical contact with the first contact spring 125 (see FIGS. 2 and 3a) and the second contact spring 126 (again, see FIGS. 2 and 3a).

Figure 3C:
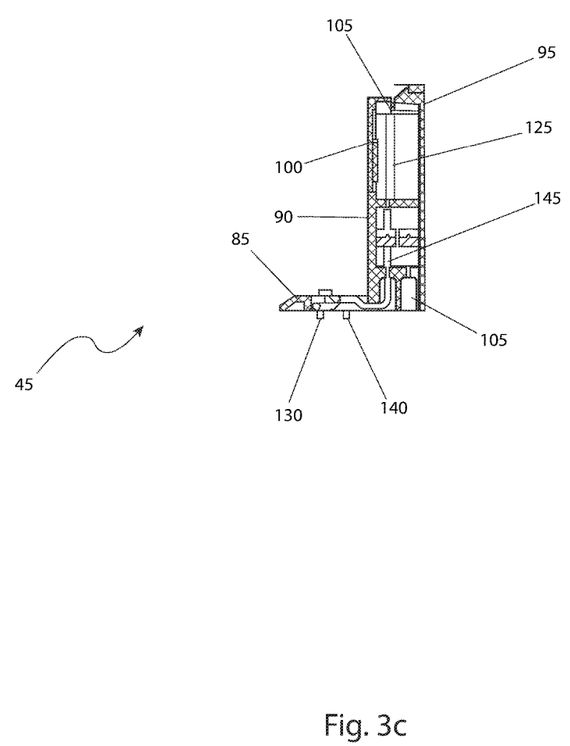

Refer now to FIG. 3c for a sectional view of the tombstone fixture 45 as seen along line I-I of FIG. 3a. That view shows the physical connection between the front housing 90 and the rear housing 95 and the captive assembly provided by the retention clips 105. That captive assembly holds the rotatable retention element 100 in a secure position as well as holding the first contact spring 125 and the second contact spring 126. The first conductive contact 130 and the second conductive contact 140 are visible on the lower portion of the base structure 85. Respective electrical connections between the first conductive contact 130 and the second conductive contact 140 to the first contact spring 125 and the second contact spring 126 (not visible due to illustrative limitations) is provided by two interior conductors 145 (only one of which is visible due to illustrative limitations). The first contact spring 125 and the second contact spring 126 are connected to the HOT and NEUTRAL lines in an AC power system respectively.

Figure 4:
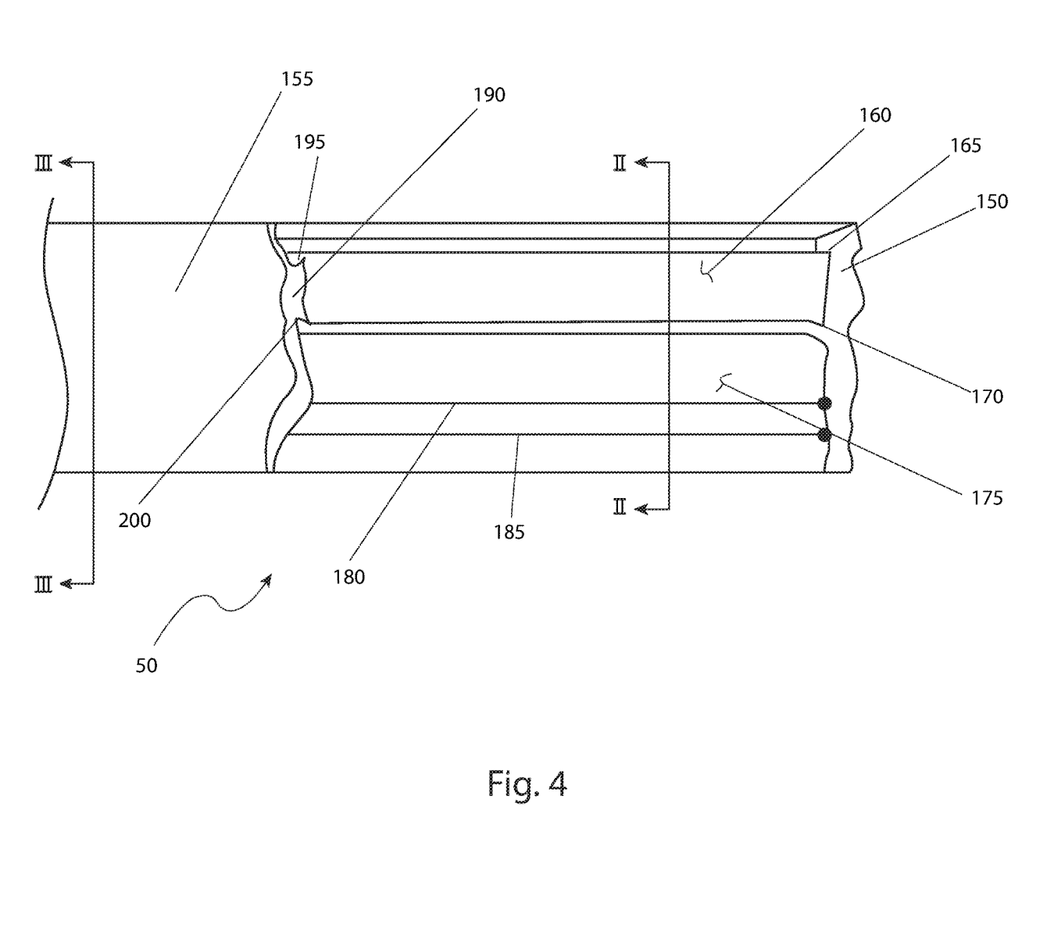
FIG. 4 is a cutaway isometric view of a powered adjustment strip 50 that is part of the adapter kit 10 shown in FIG. 1.

Refer next to FIG. 4 for a cut-away isometric view of the powered adjustment strip 50. The powered adjustment strip 50 consists of two (2) major components; a lower power rail 150 and an upper protective cover 155. As mentioned, the tombstone fixture 40 is held in place via a friction fit between the powered adjustment strip 50 and the upper protective cover 155. In practice the upper protective cover 155 completely encompasses and encases the lower power rail 150. This is for the purposes of aesthetics as well as protection against electric shock. For purposes of visual clarity FIG. 4 shows the lower power rail 150 in a staggered cut-away view.

The lower power rail 150 includes a lower retention channel 160 having an outer snap clip area 165 and an inner snap clip area 170 which occupy about one half (½) of the lower power rail 150. The other half of the lower power rail 150 is occupied by a power channel 175 which includes a first power conductor 180 and a second power conductor 185. It is envisioned that the first power conductor 180 and the second power conductor 185 would respectively be a HOT and a NEUTRAL conductor as provided as part of an AC power system. The first power conductor 180 and second power conductor 185 would electrically mate with the second conductive contact 140 (as shown in FIG. 3c) and the first conductive contact 130 (as shown in FIG. 3c), respectively. In addition, the first power conductor 180 and second power conductor 185 would provide electrical power to the first contact spring 125 and to the second contact spring 126.

To prevent a short circuit the first conductive contact 130 in the tombstone fixture 45, reference FIG. 3c, will be provided with a "U"-shaped bed where it crosses in the second power conductor 185. It is envisioned that additional power conductors can be provided in parallel with the first power conductor 180 and the second power conductor 185 to provide other electrical functionality such as a system ground, reduced illumination switching, alternative color rating illumination, or the like. Such a configuration would enable compliance with governmental laws for large institutions that have to reduce their lighting system power usage during periods of high power demand. Such additional functionality might require additional components on the tombstone fixture 45. Additional power conductors, such as provided by a three (3) conductor power circuit can be provided directly to the tombstone fixture 45 by removal of the first conductive contact 130 in the tombstone fixture 45 and a direct connection to the additional LED light tubes 20 (see FIG. 1). When the upper protective cover 155 is in place it provides insulating protection for the area not covered by a tombstone fixture 45 by overlaying the first power conductor 180 and the second power conductor 185. The upper protective cover 155 is held in mechanical contact with the lower retention channel 160 via a cap area 190 having an outer cap clip 195 and an inner cap clip 200.

Figure 5A:
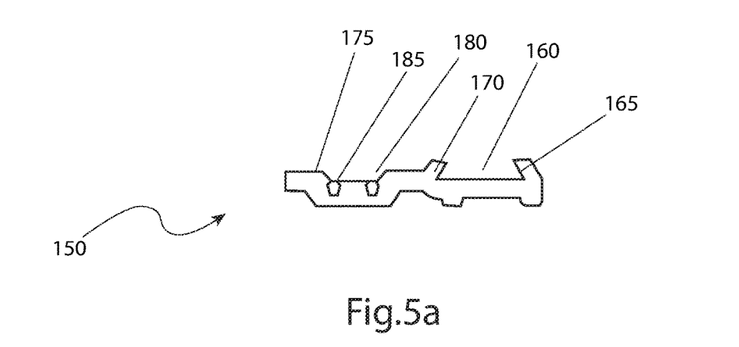
FIG. 5a is a sectional view of a lower power rail 150 as seen along line II-II of FIG. 4.

Refer now to FIG. 5a for a sectional view of the lower power rail 150 as seen along line II-II of FIG. 4. That view shows the respective configuration of the lower retention channel 160, the outer snap clip area 165, the inner snap clip area 170, the power channel 175, the first power conductor 180, and the second power conductor 185.

Figure 5B:
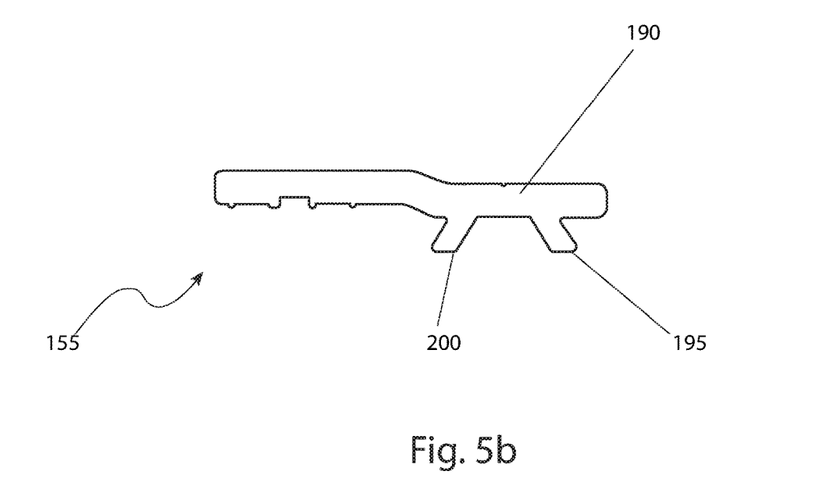
FIG. 5b is a sectional view of the upper protective cover 155 as seen along line III-III of FIG. 4; and, FIG. 6 is an electrical interconnection diagram of the adapter kit 10 shown in FIG. 1.

Refer now to FIG. 5b for a sectional view of the upper protective cover 155 as seen along line III-III of FIG. 4. That view shows the respective configuration of the cap area 190, the outer cap clip 195, and the inner cap clip 200. The outer cap clip 195 engages the outer snap clip area 165 (as shown in FIG. 5a). The inner cap clip 200 engages the inner snap clip area 170 (as shown in FIG. 5c). Mechanical contact is maintained by friction force which allows for removal/replacement at any future time for maintenance or for reconfiguring the spacing between the LED light tubes 20 (as shown in FIG. 1). Additionally, the upper protective cover 155 serves as an upper lock for the tombstone fixture 45 (as shown in FIG. 3c).

Figure 6:
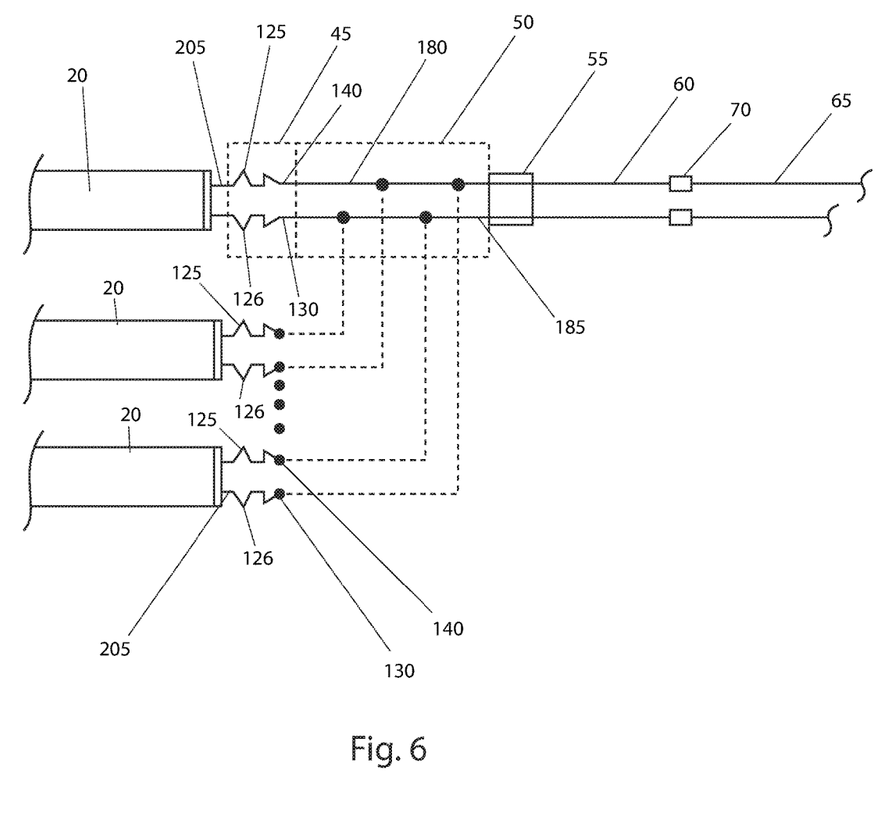

Refer now to FIG. 6 for an electrical interconnection diagram of the adapter kit 10. The LED light tubes 20 are provided with conductive prongs 205. The conductive prongs 205 accommodate the HOT and NEUTRAL conductors of the AC power system. It should be noted that conductive prongs 205 are non-polarized due to the universal polarity of an AC power system. The conductive prongs 205 are in electrical contact with the first contact spring 125 and the second contact spring 126 as shown within the tombstone fixture 45. Electrical conductance is provided to the second conductive contact 140 and the first conductive contact 130 by mating respectively with the first power conductor 180 and second power conductor 185 within the powered adjustment strip 50 and to a respective tombstone fixture 45 that transfers electrical power to the first power conductor 180 and the second power conductor 185. Additional LED light tubes 20 are connected as shown in a parallel manner. The electrical connection process then continues with the electrical plug connector 55 being connected via a mechanical friction fit. Finally, the process of fixture termination is accomplished via the incoming power conductors 60 to the fixture drop wires 65 via the electrical connector 70 in a typical and well-known manner.

The preferred embodiment of the present invention can be utilized by a qualified individual such as electrician, those skilled with working with hazardous AC voltages, or even a common homeowner who has experience installing or repairing common fluorescent light fixtures. Such installation could occur in a simple and effortless manner with little or no training.

It is envisioned that the adapter kit 10 would be constructed in general accordance with FIG. 1 through FIG. 6. Installation would progress once procurement has occurred. The user would carry out the process by disconnecting electrical power to the existing fluorescent troffer fixture 15. Next, the fixture interior would be made accessible. Existing components such as but not limited to fluorescent tubes, ballast(s), ballast covers, wiring, existing tombstones, and the like would be removed and discarded according to known and approved methods. Installation of the adapter kit 10 would progress by installing the non-powered adjustment clip 30 and the powered adjustment strip 50. A corresponding number of retention clips 25 and tombstone fixtures 45 would be installed upon the non-powered adjustment clip 30 and the powered adjustment strip 50 respectively that would match in quantity the number of LED light tubes 20 to be installed. It should be noted that the number of removed fluorescent tubes does not need to necessarily match the number of installed LED light tubes 20. A higher or lower quantity could be installed depending on other factors such as desired light levels, energy savings, usage patterns, and the like.

Next, the user would install the electrical plug connector 55 at one (1) end of the powered adjustment strip 50 and connect the incoming power conductors 60 to the fixture drop wires 65 using electrical connectors 70. The appropriate number of LED light tubes 20 then would be installed using the retention clip 25 and the tombstone fixture 45 for mechanical retention and the tombstone fixture 45 for electrical connectivity. Finally, the operation of the adapter kit 10 would be verified by applying power and ensuring illumination.

It is envisioned that installation as described would be provided by a qualified individual such as an electrician, or could be accomplished by an end user such as a homeowner. It is also envisioned that the adapter kit 10 would be approved by a listing agency such as UL and/or CSA.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. An adapter kit, comprising:
   a light tube having electrical connector prongs at a connector end;
   a troffer fixture;
   a non-powered adjustment clip mechanically connected to said troffer fixture;
   an AC powered adjustment strip mechanically attached to said troffer fixture;
   a retention clip capable of mechanically attaching a first end of said light tube to said non-powered adjustment clip;
   a tombstone fixture electrically connected to said powered adjustment strip, said tombstone fixture for mechanically retaining a powered end of said light tube and for transferring AC electrical power from said powered adjustment strip to said connector prongs;
   a fastener for attaching said tombstone fixture to said powered adjustment strip; and
   HOT and NEUTRAL line conductors for supplying HOT and NEUTRAL line voltages to said powered adjustment strip;
   wherein said tombstone fixture includes:
      a base structure;
      a front housing having an opening and an upper slot that allows said connector prongs to pass to said opening;
      a rear housing attached to said front housing;
      a rotatable retention element at said opening and held captive between said front and rear housings, said rotatable retention element for retaining said connector prongs such that said connector end is mechanically supported;
      a HOT electrical contact between said front and rear housings;
      a NEUTRAL electrical contact between said front and rear housings; and,
      a fastener for mechanically attaching said base structure to said powered adjustment clip, said fastener further for provide electrical communication between said HOT electrical contact and said HOT line voltage and between said NEUTRAL electrical contact and said NEUTRAL line voltage;
      wherein said rotatable retention element is capable of traveling in an arcuate path to provide electrical communication between said conductive prongs and said HOT electrical contact and said NEUTRAL electrical contact.

2. The adapter kit of claim 1, wherein said HOT electrical contact is a contact spring.

3. The adapter kit of claim 1, wherein said front housing and said rear housing are fastened together by said retention clip.

4. The adapter kit of claim 1 wherein said light tube is an LED light tube.

5. The adapter kit of claim 1, wherein said retention clip is movable along said non-powered adjustment clip.

6. The adapter kit of claim 5, wherein said retention clip is "U" shaped.

7. The adapter kit of claim 1, further including power connectors for connecting said HOT and NEUTRAL line voltages to incoming power conductors.

8. The adapter kit of claim 7, wherein said powered adjustment strip is for supplying said HOT and NEUTRAL line voltages to said tombstone fixture.

9. The adapter kit of claim 8, wherein said tombstone fixture is movable along said powered adjustment strip.

10. The adapter kit of claim 8, further including a non-conductive bed in said tombstone fixture disposed between said HOT and said NEUTRAL line voltages.

11. The adapter kit of claim 1, wherein said base surface includes a reinforcing grid.

12. The adapter kit of claim 11, wherein said reinforcing grid provides electrical isolation between said HOT electrical contact and said NEUTRAL electrical contact.

13. The adapter kit of claim 11, further including a protective cover over said powered adjustment strip.

14. An LED light tube adapter kit, comprising:
a LED light tube having electrical connector prongs at a connector end;
a troffer fixture;
a non-powered adjustment clip mechanically connected to said troffer fixture;
a powered adjustment strip mechanically attached to said troffer fixture, said powered adjust strip including HOT and NEUTRAL line voltages;
a retention clip mechanically attaching a first end of said LED light tube to said nonpowered adjustment clip; and,
a tombstone fixture mechanically connected to said powered adjustment strip, said tombstone fixture for transferring electrical power from said HOT and NEUTRAL line voltages to said connector prongs;
wherein said tombstone fixture includes:
a base structure;
a front housing having an opening and an upper slot that allows said connector prongs to pass to said opening;
a rear housing attached to said front housing;
a rotatable retention element at said opening and held captive between said front and rear housings, said rotatable retention element for retaining said connector prongs such that said connector end is mechanically supported;
a HOT electrical contact between said front and rear housings;
a NEUTRAL electrical contact between said front and rear housings; and,
a fastener for mechanically attaching said base structure to said powered adjustment strip, said fastener further for provide electrical communication between said HOT electrical contact and said HOT line voltage and between said NEUTRAL electrical contact and said NEUTRAL line voltage;
wherein said rotatable retention element is capable of traveling in an arcuate path to provide electrical communication between said conductive prongs and said HOT electrical contact and said NEUTRAL electrical contact.

15. The LED light tube adapter kit according to claim 14, wherein said retention clip is movable along said non-powered adjustment clip.

16. The LED light tube adapter kit according to claim 15, wherein said retention clip is "U" shaped.

17. The LED light tube adapter kit according to claim 16, wherein said tombstone fixture is movable along said powered adjustment strip.

* * * * *